United States Patent
Oyama et al.

(10) Patent No.: US 12,544,918 B2
(45) Date of Patent: Feb. 10, 2026

(54) CONSTRAINT CONDITION LEARNING DEVICE, CONSTRAINT CONDITION LEARNING METHOD, AND STORAGE MEDIUM

(71) Applicant: NEC Corporation, Tokyo (JP)

(72) Inventors: Hiroyuki Oyama, Tokyo (JP); Rin Takano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 178 days.

(21) Appl. No.: 18/278,286

(22) PCT Filed: Feb. 26, 2021

(86) PCT No.: PCT/JP2021/007355
§ 371 (c)(1),
(2) Date: Aug. 22, 2023

(87) PCT Pub. No.: WO2022/180788
PCT Pub. Date: Sep. 1, 2022

(65) Prior Publication Data
US 2024/0139950 A1  May 2, 2024

(51) Int. Cl.
*B25J 9/16*  (2006.01)

(52) U.S. Cl.
CPC .............. *B25J 9/163* (2013.01); *B25J 9/1666* (2013.01)

(58) Field of Classification Search
CPC ......... B25J 9/163; B25J 9/1666; G06N 20/00; G05B 19/00
See application file for complete search history.

(56) References Cited

U.S. PATENT DOCUMENTS

| 10,766,136 B1* | 9/2020 | Porter .................. G06N 3/045 |
| 2015/0309485 A1 | 10/2015 | Nishi |
| 2022/0105637 A1* | 4/2022 | Schillinger ............ B25J 9/0084 |
| 2022/0258343 A1 | 8/2022 | Machida et al. |

(Continued)

FOREIGN PATENT DOCUMENTS

| WO | 2014/141351 A1 | 9/2014 |
| WO | 2021/009907 A1 | 1/2021 |

(Continued)

OTHER PUBLICATIONS

Zheng, W., et al., "Solving Complex Tasks Hierarchically from Demonstrations," Jun. 2018, IEEE, 2018 Annual American Control Conference (ACC), pp. 1178-1183 (Year: 2018).*

(Continued)

*Primary Examiner* — Abby Lin
*Assistant Examiner* — Karston G. Evans
(74) *Attorney, Agent, or Firm* — Sughrue Mion, PLLC

(57) ABSTRACT

A constraint condition learning device 1X mainly includes a conversion means 15X and a constraint condition estimation means 16X. The conversion means 15X converts first time series data regarding a state and an input of a robot system during an execution period of a task executed by the robot system into second time series data represented by propositions. The constraint condition estimation means 16X estimates a constraint condition on the task as a logical formula, based on the second time series data and the information regarding whether or not the task succeeded.

8 Claims, 12 Drawing Sheets

(56) References Cited

U.S. PATENT DOCUMENTS

2022/0258344 A1    8/2022   Machida

FOREIGN PATENT DOCUMENTS

WO      2021/009933 A1    1/2021
WO      2021/014532 A1    1/2021

OTHER PUBLICATIONS

Tiger, M., Heintz, F., "Stream Reasoning using Temporal Logic and Predictive Probabilistic State Models," Oct. 2016, IEEE, 2016 23rd International Symposium on Temporal Representation and Reasoning (TIME), pp. 196-205 (Year: 2016).*
Xu, Z., Topcu, U., "Transfer of Temporal Logic Formulas in Reinforcement Learning," Sep. 2019, arXiv (Year: 2019).*
International Search Report for PCT Application No. PCT/JP2021/007355, mailed on May 18, 2021.

* cited by examiner

100: ROBOT SYSTEM

CONSTRAINT CONDITION LEARNING DEVICE, CONSTRAINT CONDITION LEARNING METHOD, AND STORAGE MEDIUM

This application is a National Stage Entry of PCT/JP2021/007355 filed on Feb. 26, 2021, the contents of all of which are incorporated herein by reference, in their entirety.

TECHNICAL FIELD

The present disclosure relates to a technical field of a constraint condition learning device, a constraint condition learning method, and a storage medium configuring perform processing on learning of constraint conditions to be used in operation planning of a robot.

BACKGROUND

There is proposed a system configured to formulate operation plan of a robot which satisfies given constraint conditions. For example, Patent Literature 1 discloses a system for generating operation control logics of the whole autonomous system and control logics of calculating a control command to be outputted to a driving device so that a set constraint format list is satisfied. Patent Literature 1 further discloses a technique of relaxing at least a portion of the set constraint form when it is determined that the operation control logics and the control logics are not feasible.

CITATION LIST

Patent Literature

Patent Literature 1: WO2014/141351

SUMMARY

Problem to be Solved

When formulating an operation plan for making a robot perform a task, it is necessary to hold the constraint conditions in advance at the time of the operation planning. On the other hand, there are such issues that it is difficult or time-consuming to set all such constraint conditions manually.

In view of the above-described issue, it is therefore an example object of the present disclosure to provide a constraint condition learning device, a constraint condition learning method, and a storage medium capable of suitably learning constraint conditions necessary for operation planning of a robot.

Means for Solving the Problem

In one mode of the constraint condition learning device, there is provided a constraint condition learning device including:
a conversion means configured to convert
first time series data regarding a state and an input of a robot system during an execution period of a task executed by the robot system
into second time series data represented by propositions; and
a constraint condition estimation means configured to estimate a constraint condition on the task as a logical formula, based on the second time series data and the information regarding whether or not the task succeeded.

In one mode of the constraint condition learning method, there is provided a constraint condition learning method executed by a computer, the control method including:
converting
first time series data regarding a state and an input of a robot system during an execution period of a task executed by the robot system
into second time series data represented by propositions; and
estimating a constraint condition on the task as a logical formula, based on the second time series data and the information regarding whether or not the task succeeded.

In one mode of the storage medium, there is provided a storage medium storing a program executed by a computer, the program causing the computer to:
convert
first time series data regarding a state and an input of a robot system during an execution period of a task executed by the robot system
into second time series data represented by propositions; and
estimate a constraint condition on the task as a logical formula, based on the second time series data and the information regarding whether or not the task succeeded.

Effect

An example advantage according to the present invention is to suitably learn constraint conditions regarding a task.

EXAMPLE EMBODIMENTS

Hereinafter, example embodiments of a constraint condition learning device, a constraint condition learning method, and a storage medium will be described with reference to the drawings.

First Example Embodiment

(1) System Configuration

Figure 1:
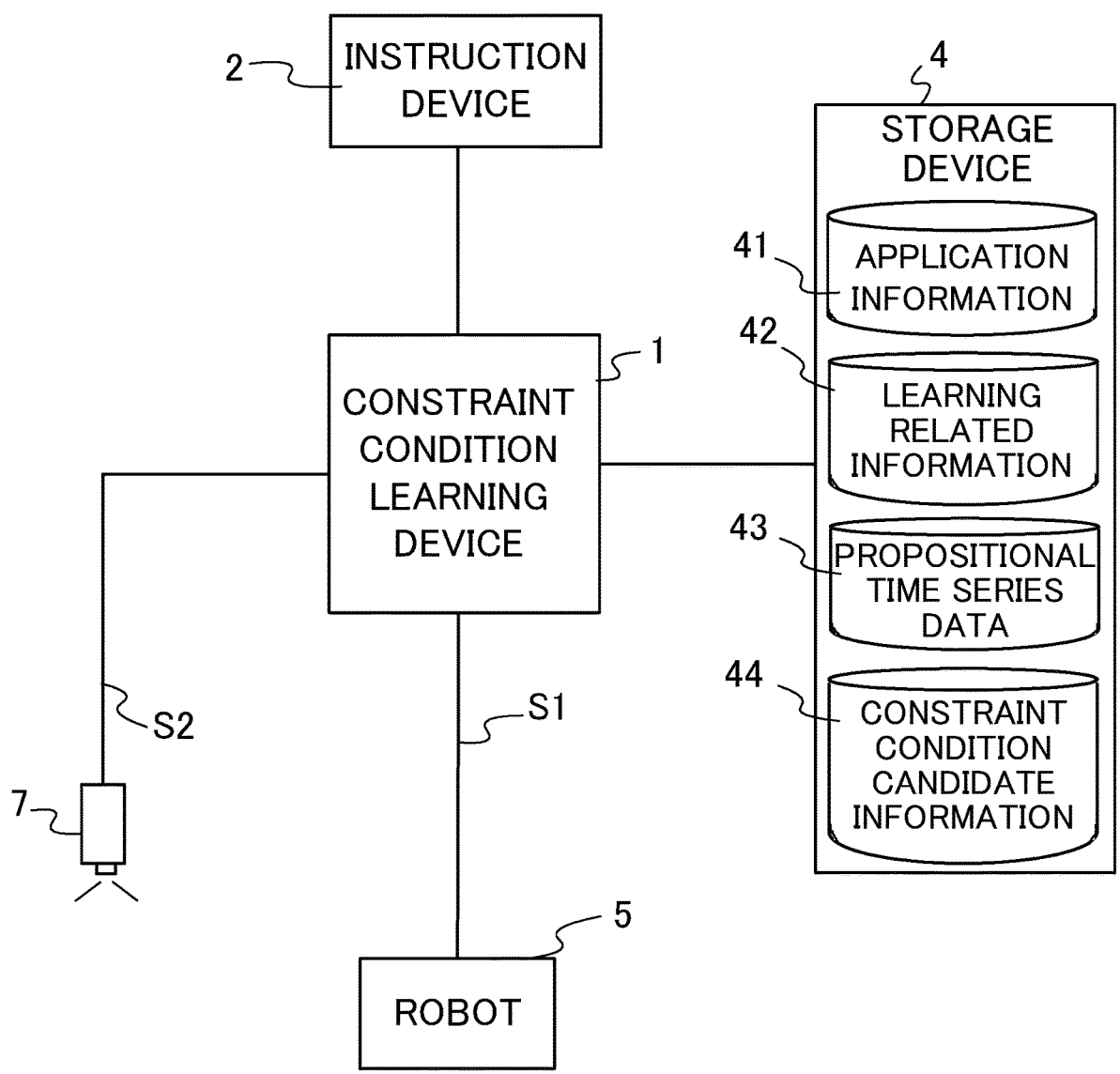
FIG. 1 It illustrates a configuration of a robot system in a first example embodiment.

FIG. 1 shows a configuration of a robot system 100 according to the first example embodiment. The robot system 100 is a system configured to learn constraint conditions to be used for operation planning of a robot, and mainly includes a constraint condition learning device 1, an instruction device 2, a storage device 4, a robot 5, and a measurement device 7.

The constraint condition learning device 1 learns constraint conditions representing conditions that should be satisfied when causing the robot 5 to execute a predetermined task. This constraint conditions are used in the operation planning of the robot 5. In the operation planning, a process of converting a task represented by logical formula such as temporal logic into a time-step sequence (also referred to as "operation sequence") of tasks each of which the robot 5 can accept.

In addition, the constraint condition learning device 1 performs data communication with the instruction device 2, the storage device 4, the robot 5, and the measurement device 7 through a communication network or through wireless or wired direct communication. For example, the constraint condition learning device 1 transmits a display control signal related to a candidate for the constraint condition generated by learning to the instruction device 2, and receives an input signal (external input signal) by the user related to the candidate from the instruction device 2. Further, when the constraint condition learning device 1 performs the learning of the constraint conditions, by performing data communication with the storage device 4, it refers to and updates the various information stored in the storage device 4. Furthermore, the constraint condition learning device 1 transmits a control signal "S1" related to the control of the robot 5 to the robot 5. In addition, the constraint condition learning device 1 receives the measurement signal "S2" from the measurement device 7.

The instruction device (display device) 2 is a device for receiving an instruction related to updating of the constraint conditions. The instruction device 2 may be a tablet terminal equipped with an input unit and a display unit, or may be a stationary personal computer.

The storage device 4 stores various information necessary for the constraint condition learning device 1 to learn the constraint conditions. The storage device 4 stores, for example, application information 41, learning related information 42, propositional time series data 43, and constraint condition candidate information 44. The application information 41 is information necessary for the operation planning of the robot 5. The learning related information 42 is information (including parameters) necessary for learning the constraint conditions. The propositional time series data 43 is time series data representing, by proposition, the transition of the state and the input (more specifically, the control input to the robot 5) of the robot system 100 during the execution period (also simply referred to as "task execution period") of the task to be executed by the robot 5. The constraint condition candidate information 44 is information representing candidates for the constraint conditions generated by the constraint condition learning device 1.

The storage device 4 may be an external storage device such as a hard disk connected or embedded in the constraint condition learning device 1, or may be a storage medium such as a flash memory. The storage device 4 may be a server device that performs data communication with the constraint condition learning device 1 via a communication network. In this case, the storage device 4 may be configured by a plurality of server devices.

The robot 5 performs a task related work based on the control signal S1 supplied from the constraint condition learning device 1. Examples of the robot 5 include a robot in a various factory such as an assembly factory and a food factory, and a robot that performs an operation at a physical distribution site. The robot 5 may be a vertical articulated robot, a horizontal articulated robot, or any other type of robot. The robot 5 may supply a signal or the like indicating the progress of the operation sequence specified by the control signal S1 to the constraint condition learning device 1.

The measurement device 7 is one or more sensors for detecting a state in a workspace in which a task is performed and examples thereof include a camera, a laser range scanner, a sonar, and a combination thereof. The measurement device 7 may include sensors provided in the robot 5 and may include sensors provided in the workspace. For example, the measurement device 7 may include an external sensor such as a camera provided in the robot 5, an internal sensor that senses the state of the robot 5 (the state of the entire robot 5 or a specific portion such as a joint), and the like. In other examples, the measurement device 7 may include a self-propelled or flying sensor (including a drone) that moves within the workspace of the robot 5. The measurement device 7 may also include a sensor that detects the contact of an object or a sound in the workspace. As such, the measurement device 7 may include a variety of sensors that detect conditions in the workspace, or may include sensors located anywhere.

The configuration of the robot system 100 shown in FIG. 1 is an example, and various changes may be made to the configuration. For example, there are plural robots 5, or the robot 5 may be equipped with a plurality of control target objects which independently operate. Further, the robot 5 may perform cooperative work with other robots, workers, or machine tools that operate in the workspace. The measurement device 7 may be a part of the robot 5. The instruction device 2 may be configured as the same device as the constraint condition learning device 1. The constraint condition learning device 1 may be configured by a plurality of devices. In this case, the plurality of devices constituting the constraint condition learning device 1 transmits and receives information necessary for executing preassigned process among the plurality of devices. In addition, the constraint condition learning device 1 and the robot 5 may be integrally configured.

(2) Hardware Configuration

Figure 2A:
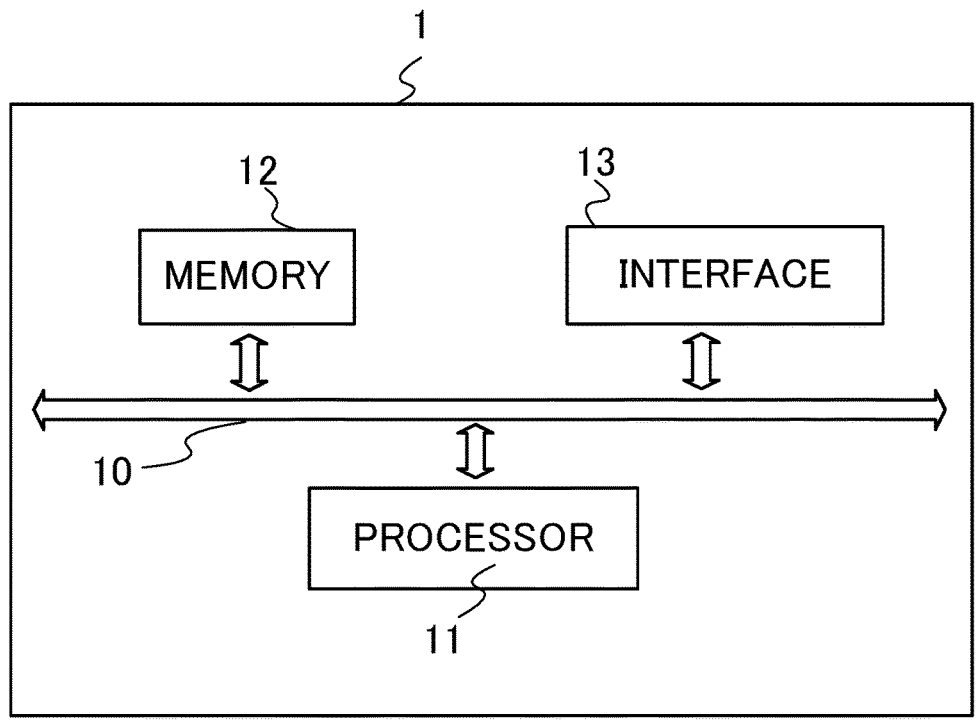
FIG. 2 It illustrates a hardware configuration of a robot controller.

FIG. 2A shows a hardware configuration of the constraint condition learning device 1. The constraint condition learning device 1 includes a processor 11, a memory 12, and an interface 13 as hardware. The processor 11, memory 12 and interface 13 are connected via a data bus 10.

The processor 11 functions as a controller (arithmetic device) for controlling the entire constraint condition learning device 1 by executing a program stored in the memory 12. Examples of the processor 11 include a CPU (Central Processing Unit), a GPU (Graphics Processing Unit), and a TPU (Tensor Processing Unit). The processor 11 may be configured by a plurality of processors. The processor 11 is an example of a computer.

The memory 12 is configured by a variety of volatile and non-volatile memories, such as a RAM (Random Access Memory), a ROM (Read Only Memory), and a flash memory. Further, in the memory 12, a program for the constraint condition learning device 1 to execute a process is stored. Apart of the information stored in the memory 12 may be stored in one or more external storage devices (e.g., the storage device 4) that can communicate with the constraint condition learning device 1, or may be stored in a storage medium detachable from the constraint condition learning device 1.

The interface 13 is one or more interfaces for electrically connecting the constraint condition learning device 1 to other devices. Examples of these interfaces include a wireless interface, such as a network adapter, for transmitting and receiving data to and from other devices wirelessly, a hardware interface, such as a cable, for connecting to other devices.

The hardware configuration of the constraint condition learning device 1 is not limited to the configuration shown in FIG. 2A. For example, the constraint condition learning device 1 may be connected to or incorporate in at least one of a display device, an input device, or an audio output device. The constraint condition learning device 1 may include at least one of the instruction device 2 and the storage device 4.

Figure 2B:
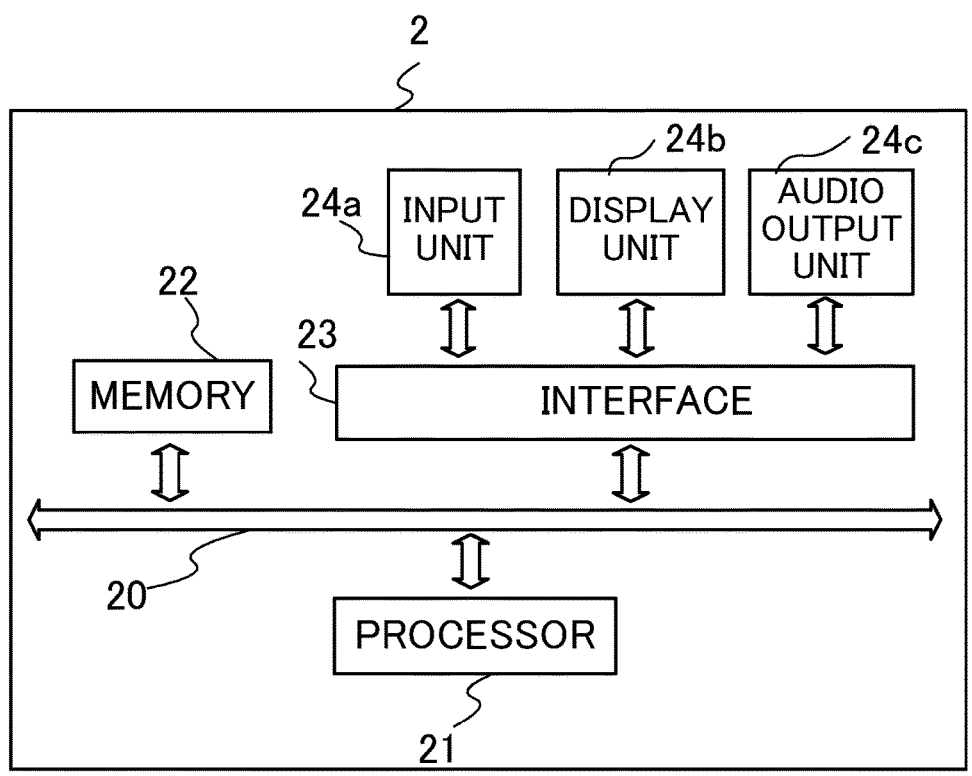

FIG. 2B shows the hardware configuration of the instruction device 2. The instruction device 2 includes, as hardware, a processor 21, a memory 22, an interface 23, an input unit 24a, a display unit 24b, and an audio output unit 24c. The processor 21, the memory 22 and the interface 23 are connected to one another via a data bus 20. Further, the input unit 24a, the display unit 24b and the audio output unit 24c are connected to the interface 23.

The processor 21 executes a predetermined process by executing a program stored in the memory 22. The processor 21 is a processor such as a CPU and a GPU. The processor 21 generates an input signal by receiving a signal generated by the input unit 24a through the interface 23 and transmits the input signal to the constraint condition learning device 1 through the interface 23. The processor 21 controls at least one of the display unit 24b or the audio output unit 24c through the interface 23 based on the output control signal received from the constraint condition learning device 1 through the interface 23.

The memory 22 is configured by various volatile and non-volatile memories such as a RAM, a ROM, a flash memory, and the like. Further, in the memory 22, a program for the instruction device 2 to execute a process is stored.

The interface 23 is one or more interfaces for electrically connecting the instruction device 2 to other devices. Examples of these interfaces include a wireless interface, such as a network adapter, for transmitting and receiving data to and from other devices wirelessly, and a hardware interface, such as a cable, for connecting to other devices. Further, the interface 23 performs the interface operation of the input unit 24a, the display unit 24b and the audio output unit 24c. The input unit 24a is an interface that receives input from a user, and examples thereof include a touch panel, a button, a keyboard, and a voice input device. The display unit 24b displays information under the control of the processor 21 and examples of the display unit 24b include a display and a projector. The audio output unit 24c is, for example, a speaker, and performs audio output under the control of the processor 21.

The hardware configuration of the instruction device 2 is not limited to the configuration shown in FIG. 2B. For example, at least one of the input unit 24a, the display unit 24b, and the audio output unit 24c may be configured as a device that is separate from and electrically connected to the instruction device 2. The instruction device 2 may also be connected to various devices such as a camera, or may incorporate them.

(3) Data Structure

Figure 3A:
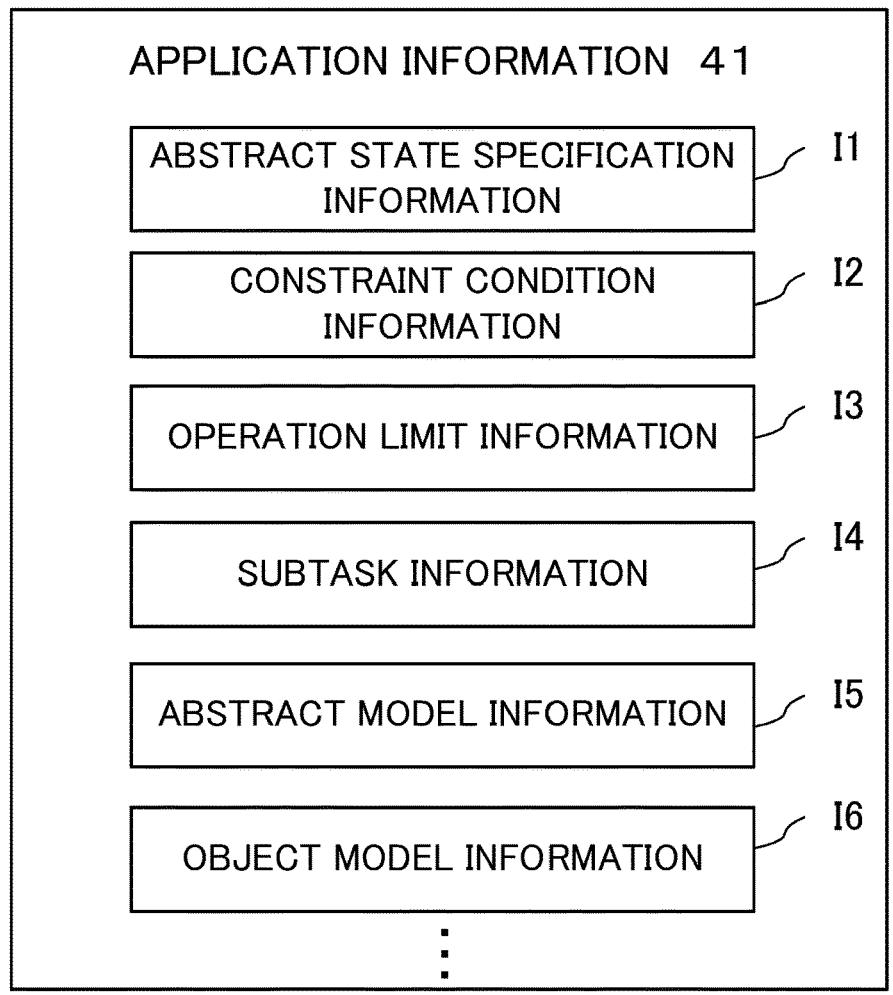
FIG. 3A illustrates an example of the data structure of application information.

FIG. 3A shows an example of the data structure of the application information 41. As illustrated in FIG. 3A, the application information 41 includes an abstract state specification information I1, a constraint condition information I2, an operation restriction information I3, a subtask information I4, an abstract model information I5, and an object model information I6.

The abstract state specification information I1 specifies an abstract state to be defined in order to generate the operation sequence. The above-mentioned abstract state is an abstract state of an object in the workspace, and is defined as a proposition to be used in the target logical formula to be described later. For example, the abstract state specification information I1 specifies the abstract state to be defined for each type of the task.

The constraint condition information I2 indicates constraint conditions at the time of performing the task. The constraint condition information I2 indicates, for example, a constraint that the robot 5 (robot arms) must not be in contact with an obstacle when the task is pick-and-place, and a constraint that the robot arms must not be in contact with each other, and the like. The constraint condition information I2 may be information in which the constraint conditions suitable for each type of the task are recorded. As described below, the constraint condition information I2 is updated by candidates of the constraint conditions learned by the constraint condition learning device 1.

The operation restriction information I3 indicates information regarding the operation limit of the robot 5 to be controlled by the constraint condition learning device 1. The operation restriction information I3 is information, for example, defining the upper limits of the speed, the acceleration, and the angular velocity of the robot 5. It is noted that the operation restriction information I3 may be information defining the operation limit for each movable portion or joint of the robot 5.

The subtask information I4 indicates information on subtasks that the robot 5 can accept. The term "subtask" herein indicates a task, in a unit which can be accepted by the robot 5, obtained by decomposing the specified task and is equivalent to a segmentalized operation of the robot 5. For example, when the specified task is pick-and-place, the subtask information I4 defines a subtask "reaching" that is the movement of a robot arm of the robot 5, and a subtask "grasping" that is the grasping by the robot arm. The subtask information I4 may indicate information relating to subtasks that can be used for each type of the task.

The abstract model information I5 is information on an abstract model in which the dynamics in the workspace are abstracted. For example, an abstract model may be a model in which real dynamics are abstracted by a hybrid system. The abstract model Information I5 includes information indicative of the switching conditions of the dynamics in the above-mentioned hybrid system. For example, in the case of pick-and-place in which the robot 5 grasps a target object of the robot 5 and then place it on a predetermined position, one of the switching conditions is that the target object cannot be moved unless it is gripped by the hand of the robot arm. For example, the abstract model information I5 includes information regarding an abstracted model suitable for each type of the task.

The object model information I6 is information regarding the object model of each object in the workspace to be recognized from the measurement signal S2 generated by the measurement device 7. Examples of the above-described each object include the robot 5, an obstacle, a tool and any other object handled by the robot 5, a working body other than the robot 5. The object model information I6 includes, for example, information required for the constraint condition learning device 1 to recognize the type, position, posture, currently-executed operation, and the like of the described above each object, and three-dimensional shape information such as CAD (Computer Aided Design) data for recognizing the three-dimensional shape of each object. The former information includes the parameters of an inference engine obtained by learning a learning model that is used in a machine learning such as a neural network. For example, the above-mentioned inference engine is preliminarily learned to output the type, the position, the posture, and the like of an object shown in the image when an image is inputted thereto. Further, when AR markers for image recognition are attached to key objects such as the above-mentioned target object, information for recognizing the key objects by the AR markers may be stored as the object model information I6.

In addition to the above-described information, the application information 41 may store various information required for the constraint condition learning device 1 to generate the control signal S1. For example, the application information 41 may include information specifying a workspace of the robot 5.

Figure 3B:
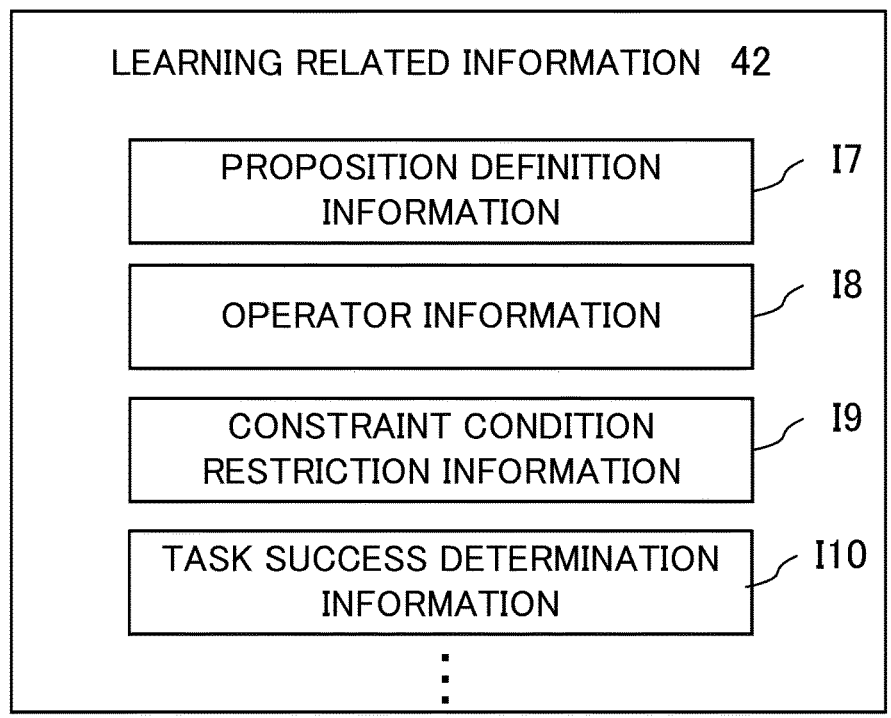
FIG. 3B illustrates an example of the data structure of propositional time series data.

FIG. 3B is an example of the data structure of the propositional time series data 43. As shown in FIG. 3B, the propositional time series data 43 includes proposition definition information I7, operator information I8, constraint condition restriction information I9, and task success determination information I10.

The proposition definition information I7 is information regarding the definition of propositions. The proposition definition information I7 is, for example, information in which each symbol representing a proposition is associated with the state of the robot system 100 and the input corresponding to the each symbol. The proposition definition information I7 may be provided for each task type to be executed by the robot 5.

The operator information I8 is information that defines the operators that can be used in a logical formula (also referred to as "constraint candidate logical formula") that is generated by the constraint condition learning device 1 as a candidate for the constraint condition. In the case of the linear temporal logic (LTL), examples of the operators defined in the operator information I8 include logical AND "∧", logical OR "∨", negative "¬", logical implication "⇒", next "∘", until "U", eventually "◇", and always "□".

It should be noted that any temporal logic, other than the linear temporal logic, such as MTL (Metric Temporal Logic) and STL (Signal Temporal Logic) may be used in constraint candidate logical formulas. Besides, the operators defined by the operator information I8 may be operators based on the above-mentioned any temporal logic.

The constraint condition restriction information I9 is information that defines a restriction in a constraint candidate logical formula that is generated by the constraint condition learning device 1 as a candidate for the constraint condition. The constraint condition restriction information I9 is, for example, information indicating an upper limit of the length of the constraint candidate logical formula (e.g., the number of propositions included in the constraint candidate logical formula).

The task success determination information I10 is information required to determine the success or failure of the task executed by the robot 5. In this case, the task success determination information I10 may be, for example, information indicating conditions of success of the task, information indicating conditions of failure of the task, or information indicating both thereof. For example, the task success determination information I10 indicates the time limit (restricted time length) for executing the task and the state when the task has succeeded (or the state when the task has failed).

In addition to the above-described information, the learning related information 42 may store various information necessary for the constraint condition learning device 1 to learn the constraint conditions.

(4) Processing Overview

Next, a processing overview of the constraint condition learning device 1 will be described. The constraint condition learning device 1 estimates constraint conditions necessary for the task by self-supervised learning. At that time, the constraint condition learning device 1 converts the time series data representing the state of the robot system 100 and the input thereto during the task execution period into propositional time series data, and estimates the constraint candidate logical formula based on the information indicative of success or failure of the task and the propositional time series data. Thereby, the constraint condition learning device 1 suitably generates a constraint candidate logical formula as a candidate for the constraint condition and updates the constraint condition information I2.

Figure 4:
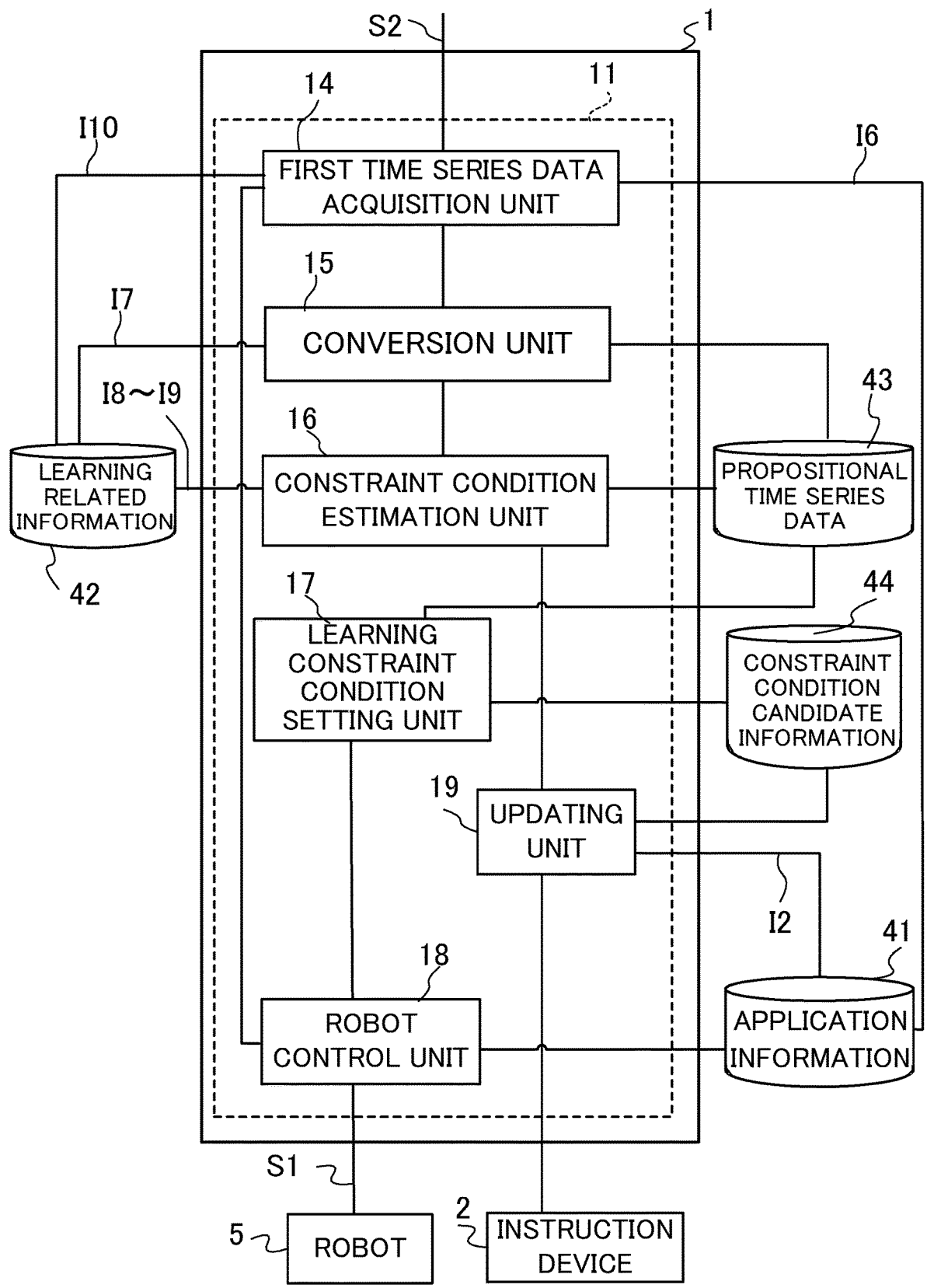
FIG. 4 It illustrates an example of functional blocks showing an outline of the processing executed by the constraint condition learning device.

FIG. 4 is an example of a functional block illustrating a processing outline of the constraint condition learning device 1. The processor 11 of the constraint condition learning device 1 functionally includes a first time series data acquisition unit 14, a conversion unit 15, a constraint condition estimation unit 16, a learning constraint condition setting unit 17, a robot control unit 18, and an updating unit 19. In FIG. 4, although an example of data to be transfer between the blocks is shown, it is not limited thereto. The same applies to other functional blocks described below.

The first time series data acquisition unit 14 acquires, based on the measurement signal S2 or the like, time series data (also referred to as "first time series data") representing the state of the robot system 100 and input thereto during the task execution period, and supplies the acquired first time series data to the conversion unit 15. The first time series data includes time series data (also referred to as "time series input data") of the control input (e.g., subtask) to the robot 5 during the task execution period and time series data (also referred to as "time series state data") of the state regarding the robot system 100. For example, the first time series data acquisition unit 14 acquires the time series input data from the robot 5 or the robot control unit 18 configured to control the robot 5. In addition, by referring to the object model information I6 or the like, the first time series data acquisition unit 14 recognizes the states of objects (including the robot 5) existing in the workspace by analyzing the measurement signal S2 using a workspace environment recognition technique (e.g., an image processing technique, an image recognition technique, a speech recognition technique, and a technique using a RFID (Radio Frequency Identifier)). Then, the first time series data acquisition unit 14 generates state recognition results in time series, as time series state data. The first time series data may be continuous values or may be discrete values.

Furthermore, the first time series data acquisition unit 14 determines the success/failure of the task executed by the robot 5 based on the task success determination information I10 and the first time series data. In this case, for example, when the task success determination information I10 indicates the time limit of the task and the state (success state) where the task has succeeded, the first time series data acquisition unit 14 determines whether or not the state after the time limit has elapsed from the start of the task execution is a success state, based on the first time series data. In this case, the first time series data acquisition unit 14 may make, based on any pattern recognition processing technique, the determination of success/failure of the task. Then, the first time series data acquisition unit 14 supplies the information indicating the determination result of the success/failure of the task, together with the corresponding first time series data, to the conversion unit 15. The first time series data acquisition unit 14 is an example of the "task success determination means" in the present disclosure.

The conversion unit 15 converts the first time series data into the propositional time series data, based on the proposition definition information I7, and stores the converted data in the storage device 4 as the propositional time series data 43. In this instance, the conversion unit 15 divides the first time series data into the time-step state data and the time-step input data per time step, and converts the time-step state data and the time-step input data into propositions based on the proposition definition information I7 indicating the correspondence between the proposition and data of the state and the input. The proposition per time step may be one or multiple. The conversion unit 15 may make the determination of success/failure of the task in place of the first time series data acquisition unit 14. In this case, instead of making the above-described determination based on the first time series data, the conversion unit 15 may make the above-described determination based on the propositional time series data 43.

The constraint condition estimation unit 16 estimates the constraint conditions required to success the task executed by the robot 5, based on the propositional time series data 43, the operator information I8, and the constraint condition restriction information I9. Specifically, the constraint condition estimation unit 16 generates a constraint candidate logical formula that is a logical formula candidate for the constraint condition and supplies information regarding the constraint candidate logical formula to the updating unit 19. In this instance, the constraint condition estimation unit 16 may estimate the constraint condition using any technique such as an algorithm of a satisfiability problem (SAT), a decision tree, and a Bayesian (Bayes) estimation. In this case, the constraint condition estimation unit 16 may supply the probability of the calculated constraint candidate logical formula indicating the likelihood as a constraint condition to the updating unit 19 together with the constraint candidate logical formula. The constraint condition estimated by the constraint condition estimation unit 16 is a constraint condition that satisfies a criterion for determining whether or not it affects the result (success or failure) of the task.

For example, when estimating a constraint condition using Bayesian estimation, assuming that a set of constraint conditions is "$\Phi$" ($\varphi \in \Phi$), the constraint condition estimation unit 16 obtains "$\varphi^*$" with the largest posteriori probability as a constraint candidate logical formula. Here, $\varphi^*$ is represented by the following equation using a set "X" ($\pi \in X$) of the propositional time series data.

$$\phi^* = \mathrm{argmax}_\Phi P(\phi|X) \qquad \text{[Formula 1]}$$

$P(\varphi|X)$ is expressed by the following equation according to Bayes' theorem.

$$P(\phi|X) = \frac{P(\phi)P(X|\phi)}{\sum_{\phi \in \Phi} P(\phi)P(X|\phi)} \qquad \text{[Formula 2]}$$

Based on the propositional time series data 43 and the constraint condition candidate information 44, the learning constraint condition setting unit 17 sets a constraint condition (also referred to as "learning constraint condition") to be used in the operation plan of the robot 5 for the subsequent execution of the task to newly obtain the first time series data. In this case, for example, the learning constraint condition setting unit 17 selects a constraint condition (e.g., a constraint condition in which the probability is equal to or less than a predetermined value) according to the probability included in the constraint condition candidate information 44, and sets a constraint condition (i.e., a constraint condition that always contradicts the selected constraint condition) which contradicts the selected constraint condition as a learning constraint condition. Then, the learning constraint condition setting unit 17 supplies information regarding the set learning constraint condition to the robot control unit 18. In this instance, the robot control unit 18 formulates an operation plan so as to satisfy not only the constraint conditions indicated by the constraint condition information I2 but also the learning constraint condition set by the learning constraint condition setting unit 17. When the task based on the above-described operation plan successfully completed, the constraint condition estimation unit 16 determines that the constraint condition selected by the learning constraint condition setting unit 17 is unnecessary and deletes the constraint condition from the constraint condition candidate information 44. The learning constraint condition setting unit 17 may set the time series data of the propositions as the learning constraint condition, or may set the propositions represented by temporal logic as the learning constraint condition.

Even when the probability representing the likelihood is not associated with the constraint candidate logical formula, the learning constraint condition setting unit 17 may randomly (or one by one in order) select the constraint candidate logical formula registered in the constraint condition candidate information 44 and set a constraint condition which contradicts the selected constraint condition as the learning constraint condition.

The learning constraint condition setting unit 17 may evaluate informational quantity (entropy) and set an ambiguous and independent constraint condition (hypothesis) as a learning constraint condition. In this case, the mean informational quantity (information entropy) "$H_\varphi$" for the constraint condition "φ" shown below is used as an index of ambiguity.

$$H_\phi(\Phi|X) = \Sigma_{\phi \in \Phi} -P(\phi|X) \log P(\phi|X) \quad \text{[Formula 3]}$$

As an index of independence, for example, the mean informational quantity (information entropy) "$H_\pi$" for the propositional time series data "π" shown below is used.

$$H_\pi(X) = \Sigma_{\pi \in X} -P(\pi) \log P(\pi) \quad \text{[Formula 4]}$$

The mean informational quantity (information entropy) "H" obtained by combining the mean informational quantity $H_\phi$ and the mean informational quantity $H_\pi$ using the weight parameter "α" is expressed as follows.

$$H(X) = H_\phi(\Phi|X) + \alpha H_\pi(X) \quad \text{[Formula 5]}$$

Therefore, the learning constraint condition setting unit 17 calculates the mean informational quantity H based on the weight parameter a stored in advance in the memory 12 or the like, and calculates, as a learning constraint condition, the propositional time series data "π*" such that the calculated mean informational quantity H is minimized. Specifically, the learning constraint condition setting unit 17 calculates, as a learning constraint condition, the propositional time series data π* satisfying the following equation.

$$\pi^* = \text{argmin } H(X) \quad \text{[Formula 6]}$$

"X" represents a set of propositional time series data when π* is used as the constraint condition. The learning constraint condition setting unit 17 may evaluate informational quantity using the mutual information instead of using the mean informational quantity.

The robot control unit 18 generates an operation sequence to be executed by the robot 5 on the basis of the application information 41 and the learning constraint condition set by the learning constraint condition setting unit 17, and supplies a control signal S1 representing the operation sequence to the robot 5. In this instance, for example, the robot control unit 18 expresses the task to be executed by the robot 5 by a logical formula, in temporal logic, indicating the goal state to be achieved, then the robot control unit 18 determines the control input to the robot 5 for each time step by solving the optimization problem, on the basis of the above-mentioned logical formula, the constraint conditions, and the abstracted dynamics model represented by the abstract model information I5. Then, the robot control unit 18 converts the control input for each time step into a sequence of subtasks, based on the subtask information I4, and supplies the control signal S1 indicating the sequence of the subtasks as an operation sequence to the robot 5. In this instance, the constraint conditions that the robot control unit 18 uses for the operation planning includes the constraint conditions indicated by the constraint condition information I2 and the learning constraint condition that is set by the learning constraint condition setting unit 17.

The updating unit 19 updates the constraint condition candidate information 44 based on the estimation result by the constraint condition estimation unit 16. In this case, the updating unit 19 stores the constraint candidate logical formula (and probability representing the likelihood) generated by the constraint condition estimation unit 16 in the storage device 4 as the constraint condition candidate information 44. Further, the updating unit 19 compares the constraint candidate logical formula already stored as the constraint condition candidate information 44 with the constraint candidate logical formula newly supplied by the constraint condition estimation unit 16. Then, if these are substantially identical, the updating unit 19 includes only one of them in the constraint condition candidate information 44. In this case, the updating unit 19 may include the latest constraint candidate logical formula supplied by the constraint condition estimation unit 16 in the constraint condition candidate information 44, or may include the shorter logical formula in the constraint condition candidate information 44, or may include the constraint candidate logical formula with the higher probability representing the likelihood in the constraint condition candidate information 44. If the constraint candidate logical formula already stored as the constraint condition candidate information 44 is not compatible with the constraint candidate logical formula supplied by the constraint condition estimation unit 16 (i.e., if these conditions contradict each other), the updating unit 19 includes only one of them in the constraint condition candidate information 44.

In addition, if the learning of the constraint conditions ends, the updating unit 19 performs process to integrate the constraint condition candidate information 44 into the constraint condition information I2. In this case, if the constraint condition candidate information 44 includes a constraint candidate logical formula which contradicts any of the fixed constraint conditions (also referred to as "existing constraint conditions") indicated by the constraint condition information I2, the updating unit 19 receives an input that allows the user to select either one of the existing constraint condition and the constraint candidate logical formula. In this case, the updating unit 19 transmits an output control signal to the instruction device 2 to thereby cause the instruction device 2 to display the existing constraint condition and the constraint candidate logical formula as selection targets, and receives an input signal indicating a user selection result from the instruction device 2. The updating unit 19 determines which of the existing constraint condition and the constraint candidate logical formula is to be included in the constraint condition information I2, on the basis of the input signal received from the instruction device 2. Even when a constraint candidate logical formula similar to any of the existing constraint conditions is included in the constraint condition candidate information 44, the update unit 19 may also accept an input that causes the user to select which to adopt the constraint candidate logical formula or the existing constraint condition similar thereto.

Here, each component of the first time series data acquisition unit 14, the conversion unit 15, the constraint condition estimation unit 16, the learning constraint setting unit 17, the robot control unit 18, and the updating unit 19 can be realized, for example, by the processor 11 executing a program. Additionally, the necessary programs may be recorded on any non-volatile storage medium and installed as necessary to realize each component. It should be noted that at least some of these components may be implemented by any combination of hardware, firmware, and software, or the like, without being limited to being implemented by software based on a program. At least some of these components may also be implemented by a user programmable integrated circuit such as a FPGA (Field-Programmable Gate Array) and a microcontroller. In this case, the integrated circuit may be used to realize a program functioning as the above components. At least some of the components may also be configured by an ASSP (Application Specific Standard Produce), an ASIC (Application Specific Integrated Circuit), or a quantum computer-controlled chip. Accordingly, each component may be implemented by any kind of hardware. The above is true for other example embodiments described later. Furthermore, each of these components may be implemented by the cooperation of a plurality of computers, for example, using cloud computing technology.

(5) Specific Examples

Figure 5:
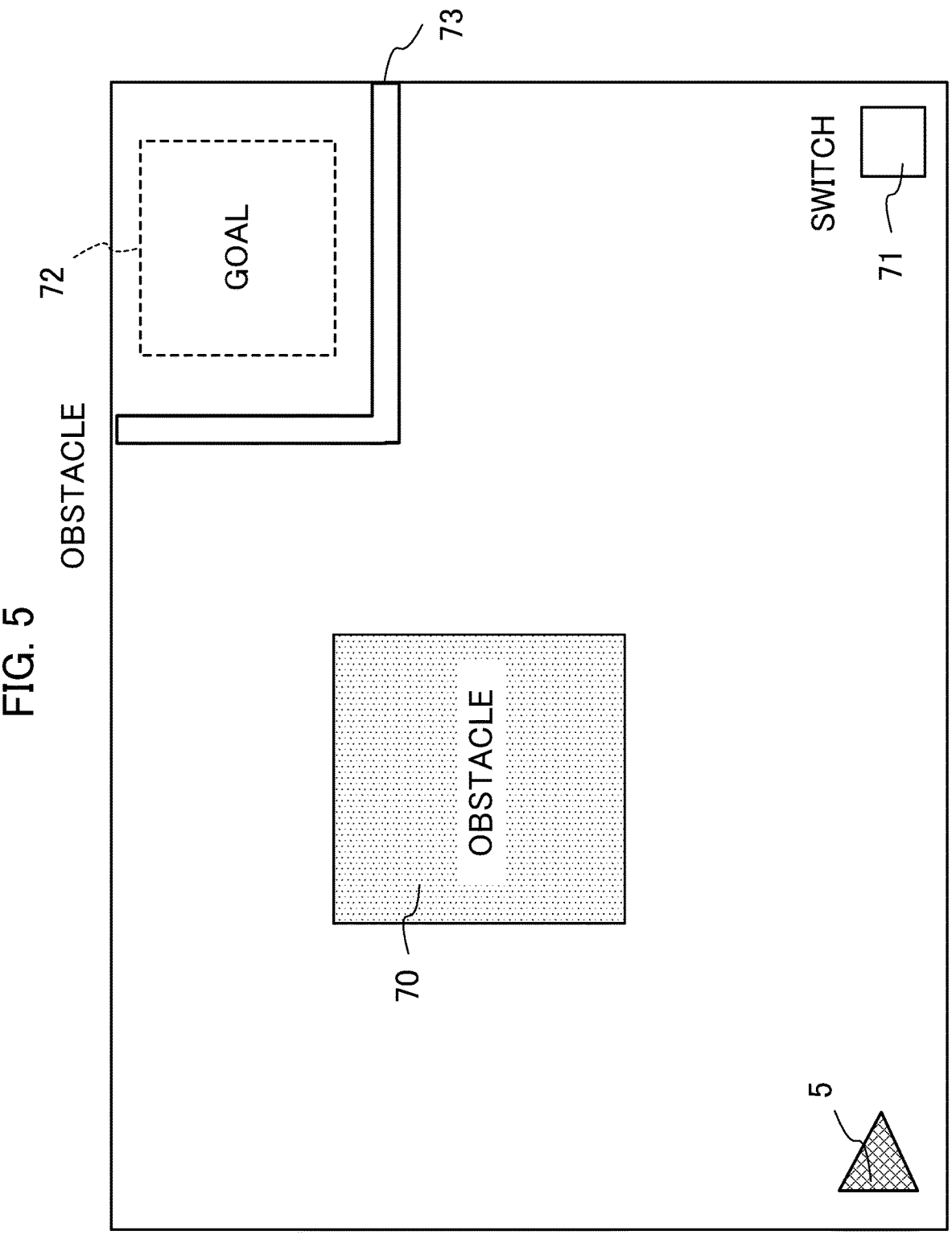
FIG. 5 It illustrates a first example of the workspace for a task performed by a mobile robot.

FIG. 5 is a first example of a workspace for a task when the robot 5 is a mobile robot. Hereinafter, such a task of the robot 5 that the robot 5 arrives at the goal area 72 in a workspace where the robot 5, obstacles 70 and 73, and the switch 71 exist will be assumed. Here, the obstacle 73 surrounds the goal area 72 so that the robot 5 cannot reach the goal area 72 in the off-state of the switch 71 that is the initial state, and makes a state transition (e.g., into a state where the switch 71 is stored inside a floor or a wall) so that the robot 5 can reach the goal area 72 in the on-state of the switch 71.

In this instance, the propositions for the goal area 72, the obstacles 70 and 73, and the switch 71 are defined in the proposition definition information I7. As an example, it is herein assumed that the proposition "g" that the robot 5 is present in the goal area 72, the proposition "h1" that the robot 5 is in contact with the obstacle 70, the proposition "h2" that the robot 5 is in contact with the obstacle 73, and the proposition "p" that the robot 5 presses the switch 71 are defined in the proposition definition information I7. The proposition definition-information I7 may further include a proposition regarding the starting point of the robot 5. In the operator information I8, eventually "◇", and always "□" are specified as usable operators. In addition, the task success determination information I10 indicates that the robot 5 should arrive in the goal area 72 within four time steps (i.e., up to t=4 when t=0 is the task start time) as the task success conditions. In addition, it is assumed that a constraint condition that "the robot 5 is always not in contact with the obstacle 70 (□¬h1)" is included in the constraint condition information I2.

Then, the robot control unit 18 of the constraint condition learning device 1 formulates an operation plan of the robot 5. In this case, if the robot control unit 18 generates plural operation sequences to be candidates in the operation planning, the robot control unit 18 causes the robot 5 to sequentially execute the operation sequences.

Figure 6:
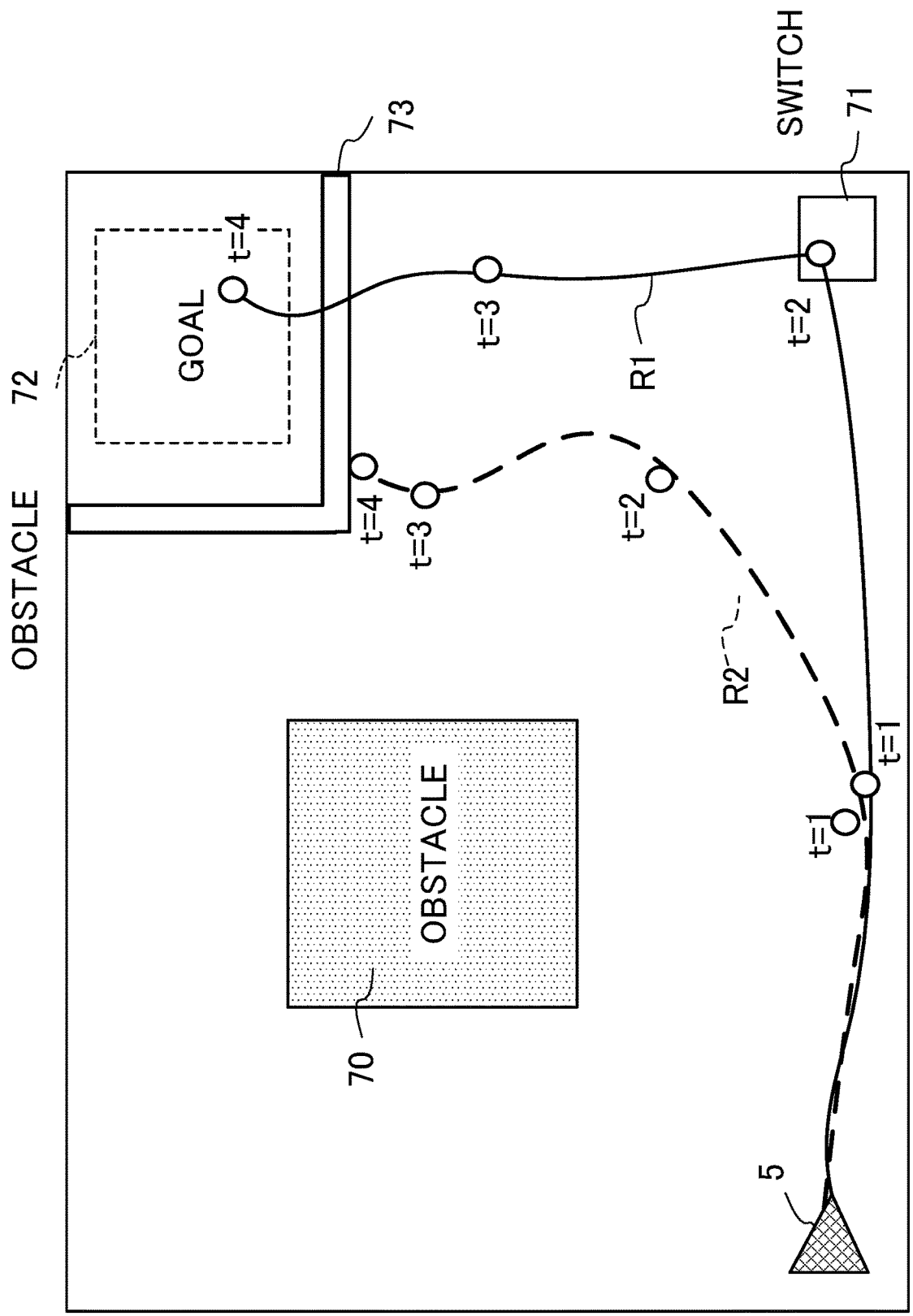
FIG. 6 It illustrates the locus of movement of the robot when the task is successfully completed and the locus of movement of the robot when the task fails.

FIG. 6 is a diagram clearly illustrating the movement locus "R1" of the robot 5 when the task succeeded and the movement locus "R2" of the robot 5 when the task failed in the workspace for the task shown in FIG. 5. In FIG. 6, the task start time is set to t=0, and the position of the robot 5 at each of t=1 to t=4 is clearly indicated by circle.

In this instance, the first time series data acquisition unit 14 generates the first time series data during the task execution period (period from t=0 to t=4), on the basis of the control signal S1 and the measurement signal S2 or the like, and determines success or failure of the task on the basis of the task success determination informational I10 and the first time series data. The conversion unit 15 generates propositional time series data corresponding to the movement locus R1 when the task succeeded and propositional time series data corresponding to the movement locus R2 when the task failed. Here, the propositional time series data when the task succeeded indicates a time step proposition sequence [{ }, {p}, { }, {g}] (herein { } represents no proposition) from t=0 to t=4, and the propositional time series data when the task failed indicates a time step proposition sequence [{ }, { }, { }, {h2}] from t=0 to t=4.

In this case, for simplicity of explanation, up to one proposition at each time step is included in the propositional time series data, but multiple propositions at each time step may be included. The task failure examples are not limited to the pattern corresponding to the movement locus R2 and may include a plurality of patterns. Similarly, the task success examples are not limited to the pattern corresponding to a movement locus R1 and may include a plurality of patterns.

Then, the constraint condition estimation unit 16 of the constraint condition learning device 1 generates the constraint candidate logical formulas based on the propositional time series data when the task succeeded and the propositional time series data when the task failed. Here, as an example, the constraint condition estimation unit 16 calculates "◇p" indicating that the switch 71 is pressed, and "□¬h2" indicating that the robot 5 is always not in contact with the obstacle 73, as constraint candidate logical formulas.

Figure 7:
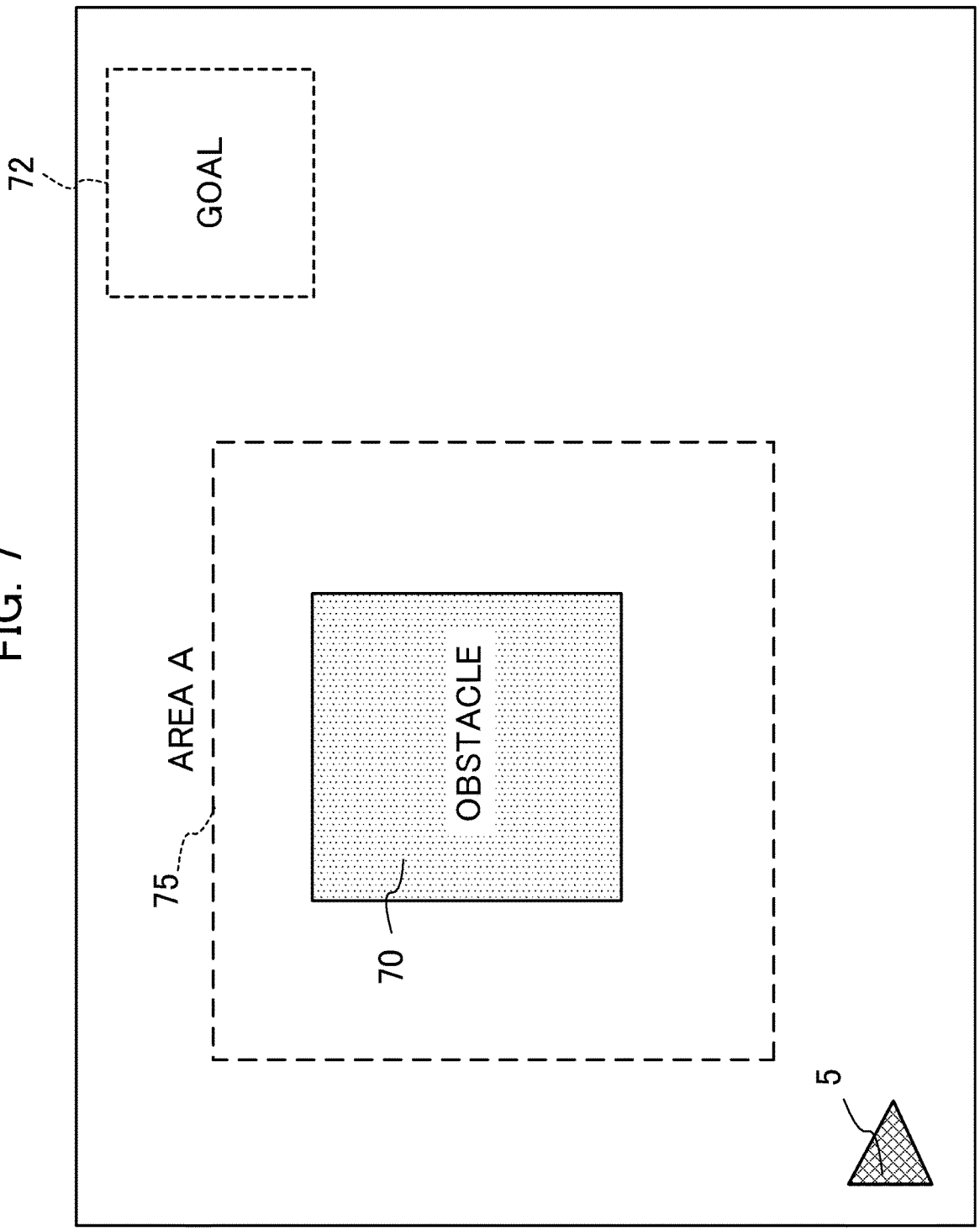
FIG. 7 It illustrates a second example of the workspace for a task performed by a mobile robot.

FIG. 7 is a second example of a workspace for a task when the robot 5 is a mobile robot. In the example shown in FIG. 7, instead of the proposition h1 regarding the obstacle 70, a proposition "h3" indicating that the robot 5 exists in the area A (see the dashed line frame 75), which is a rectangular area surrounding the obstacle 70. Then, it is assumed that the constraint condition estimation unit 16 generates two constraint candidate logical formulas, "the robot 5 is always not in contact with the obstacle 70 (□¬h1)" and "the robot 5 always does not enter the area A (□¬h3)", together with each probability representing the likelihood.

In this instance, on the basis of the above-described probability, the learning constraint condition setting unit 17 sets a constraint condition "h3" which contradicts (i.e., does not satisfy intentionally) the constraint candidate logical formula "the robot 5 always does not enter the area A (□¬h3)", and then causes the robot control unit 18 to formulate an operation plan such as to pass through the area A. The learning constraint condition setting unit 17 may set the time series data of the propositions as a learning constraint condition on the basis of the above-described informational quantity evaluation or the like. In this case, for example, the learning constraint condition setting unit 17 sets [{ }, {p}, {h3}, {g}] as a learning constraint condition.

Then, if the task based on the operation plan that the robot control unit 18 formulates on the basis of the learning constraint condition set by the learning constraint condition setting unit 17 is successfully completed, the constraint condition estimation unit 16 deletes the constraint candidate logical formula corresponding to □¬h3 from the constraint condition candidate information 44 because there is a successful example of the task that does not satisfy the constraint condition "□¬h3". In this way, the constraint condition learning device 1 performs trials of the task while changing the constraint conditions, and can appropriately update the constraint condition candidate information 44.

Figure 8:
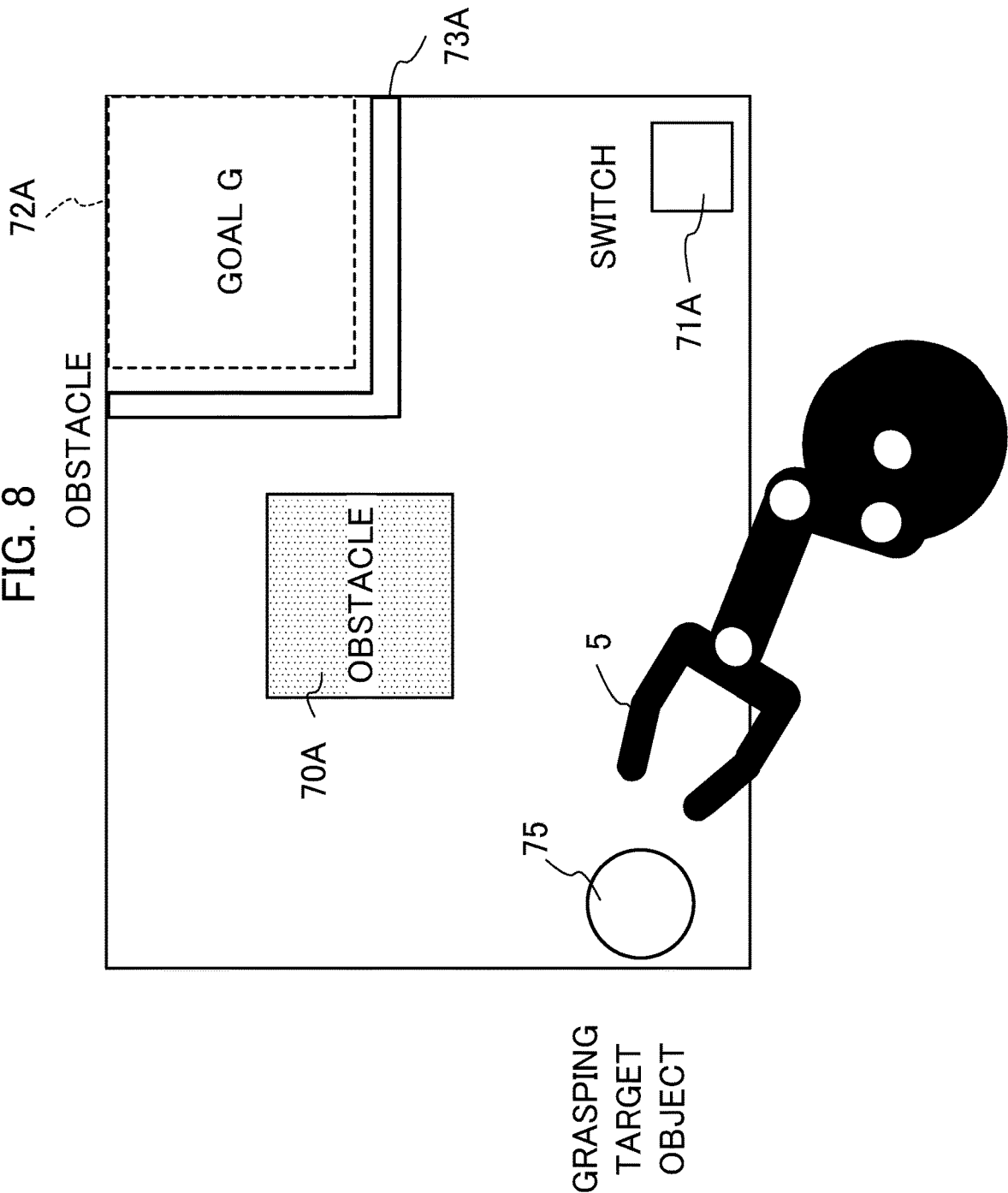
FIG. 8 It is a schematic diagram of a workspace for a task performed by a robot which performs pick-and-place.

FIG. 8 is a schematic view of a workspace for a task when the robot 5 is a robot performing pick-and-place. Hereinafter, such a task that the robot 5 moves by pick-and-place a grasping target object 75 into the goal area 72A in a workspace where the robot 5, the obstacles 70A and 73A, the switch 71A, and the grasping target object 75 exist will be assumed. Here, the obstacle 73A surrounds the goal area 72A so that the end effector of the robot 5 cannot move onto the goal area 72A in the off-state of the switch 71A that is the initial state, and makes a state transition so that the end effector of the robot 5 can move onto the goal area 72A in the on-state of the switch 71.

In this case, the definition of the propositions regarding the goal area 72A, the obstacles 70A and 73A, the switch 71A, and the grasping target object 75 is included in the proposition definition information I7. As an example, the proposition "g" that the grasping target object 75 exists in the goal area 72A, the proposition "h1" that the robot 5 is in contact with the obstacle 70A, the proposition "h2" that the robot 5 is in contact with the obstacle 73A, and the proposition "p" that the robot 5 presses the switch 71A are defined in the proposition definition information I7. In addition, it is assumed that a grasping target object 75 should arrive at the goal area 72A within four time steps as a task success condition included in the task success determination information I10. In addition, it is assumed that the constraint condition I2 includes a constraint condition that "the robot 5 always is not in contact with the obstacle 70A ($\Box\neg h1$)".

In this case, similarly to the cases shown in FIGS. 5 to 7, after formulating the operation plan of the robot 5, the constraint condition learning device 1 generates the first time series data during the task execution period (period from t=0 to t=4), based on the control signal S1 and the measurement signal S2 or the like, and then generates the propositional time series data in the case where the task succeed and the propositional time series data in the case where the task failed. The constraint condition learning device 1 calculates the constraint candidate logical formulas (e.g., "$\Diamond p$" and "$\Box\neg h2$") based on the propositional time series data when the task succeeded and the propositional time series data when the task failed.

As described above, the constraint condition learning device 1 can suitably calculate the constraint candidate logical formulas based on the self-supervised learning, regardless of the type of the robot 5 and the type of the task.

(6) Processing Flow

Figure 9:
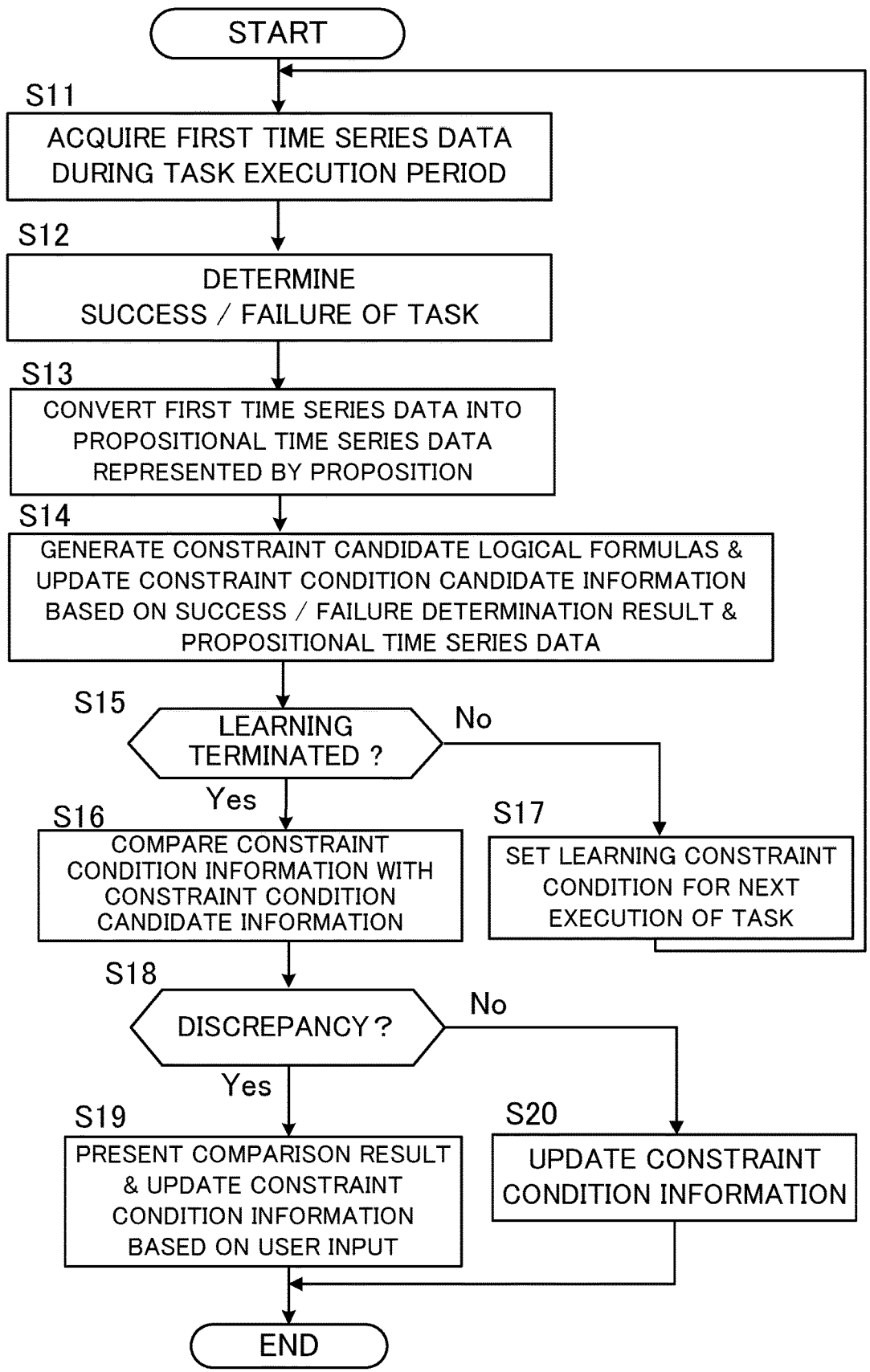
FIG. 9 It illustrates an example of a flowchart indicating a processing procedure related to learning of constraint conditions executed by the constraint condition learning device according to the first example embodiment.

FIG. 9 is an example of a flowchart illustrating a processing procedure related to a constraint condition learning that is executed by the constraint condition learning device 1 in the first example embodiment.

First, the first time series data acquisition unit 14 of the constraint condition learning device 1 acquires the first time series data representing the state and the input relating to the robot during the task execution period (step S11). Then, the first time series data acquisition unit 14 makes, based on the first time series data, the determination of the success/failure of the task performed by the robot 5 (step S12).

Then, the conversion unit 15 converts the first time series data acquired at step S11 into propositional time series data represented by proposition (step S13). Then, based on the determination result of success/failure of the task determined at step S12 and the propositional time series data generated at step S13, the constraint condition estimation unit 16 generates a constraint candidate logical formula and the updating unit 19 updates the constraint condition candidate information 44 based on the generated constraint candidate logical formula (step S14). In this case, the constraint condition estimation unit 16 may generate the probability information representing the likelihood of the constraint candidate logical formula, and the updating unit 19 may include the probability information in the constraint condition candidate information 44.

Then, the updating unit 19 determines whether or not the learning is completed (step S15). In this case, for example, when receiving an input signal instructing the learning termination from the instruction device 2, the updating unit 19 determines that the learning should be terminated. In another example, the updating unit 19 may refer to the end condition of the learning previously stored in the memory 12 or the like, and may determine that the learning should be terminated when the end condition is satisfied.

When it is determined that learning should not be terminated (step S15; No), the learning constraint setting unit 17 sets the learning constraint condition to be used in the subsequent execution of the task (step S17). Then, the constraint condition learning device 1 gets back to the process at step S11. In this instance, the robot control unit 18 formulates the operation plan of the robot 5 by using the learning constraint condition set at step S17 as a constraint condition, and causes the robot 5 to perform the task.

On the other hand, when it is determined that the learning should be terminated (step S15; Yes), the updating unit 19 compares the constraint condition information I2 with the constraint condition candidate information 44 (step S16). Then, the updating unit 19 determines whether or not there is a discrepancy between the constraint condition information I2 and the constraint condition candidate information 44 based on the comparison result between the constraint condition information I2 and the constraint condition candidate information 44 (step S18). When there is a discrepancy between the constraint condition information I2 and the constraint condition candidate information 44 (i.e., constraint conditions which contradict each other are included) (step S18; Yes), the updating unit 19 causes the instruction device 2 to display the comparison result between the constraint condition information I2 and the constraint condition candidate information 44 and updates the constraint condition information I2 on the basis of a user input received from the instruction device 2 (step S19). In this instance, the updating unit 19 transmits a display control signal for displaying the contradictory constraint conditions in a selectable manner to the instruction device 2, and receives an input signal related to the above-described selection generated by the input unit 24a of the instruction device 2 from the instruction device 2, thereby recognizing the constraint condition to be adopted.

On the other hand, if there is no discrepancy between the constraint condition information I2 and the constraint condition candidate information 44 (step S18; No), the updating unit 19 updates the constraint condition information I2 (step S20). In this instance, the updating unit 19 registers the constraint conditions included in the constraint condition candidate information 44 in the constraint condition information I2. If there are constraint conditions that are substantially identical to each other in the constraint condition information I2 and the constraint condition candidate information 44, the updating unit 19 may leave only one of them in the constraint condition information I2.

As described above, the constraint condition learning device 1 in the first example embodiment can autonomously learn the constraint conditions by self-supervised learning.

(7) Modifications

Next, a description will be given of some modifications of the example embodiment described above. The following modifications may be applied to the above-described example embodiment in any combination.

First Modification

When learning the constraint conditions, the constraint condition learning device 1 may acquire the first time series data by constructing a virtual robot system by simulation instead of acquiring the first time series data by actually operating the robot 5.

Figure 10:
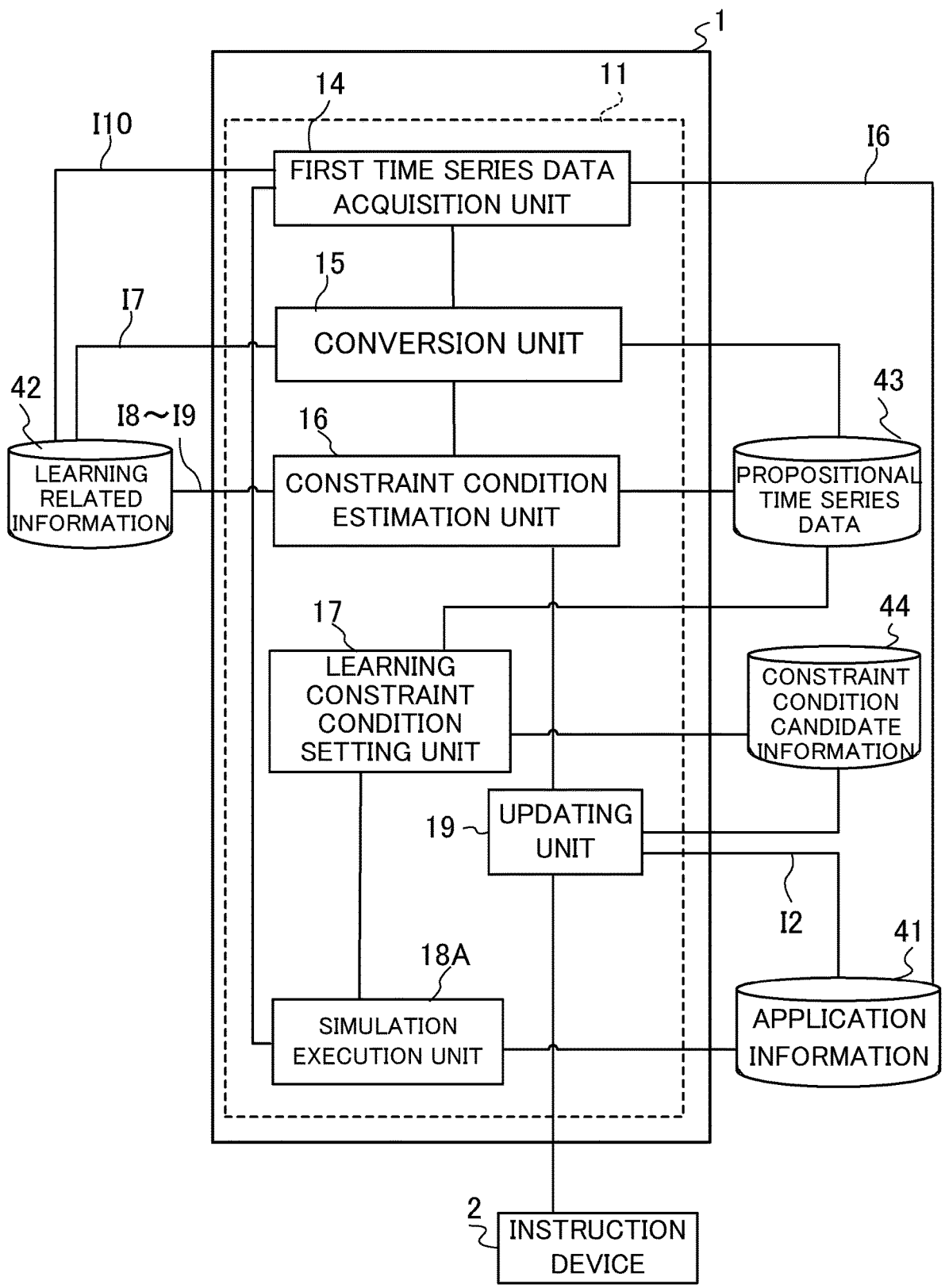
FIG. 10 It illustrates an example of functional blocks of the constraint condition learning device in the modification.

FIG. 10 is an example of a functional block of the constraint condition learning device 1 in the first modification. The constraint condition learning device 1 shown in FIG. 10 is equipped with a simulation execution unit 18A instead of the robot control unit 18. Then, the simulation execution unit 18A causes the simulation model of the robot to execute an operation sequence corresponding to the formulated operation plan, instead of sending a control signal S1 based on the operation plan to the robot 5 after the formulation of the operation plan. Then, the simulation execution unit 18A generates the time series data of the state of the robot system and the input to the robot obtained in the simulation as the first time series data, and supplies the generated first time series data to the first time series data acquisition unit 14.

As described above, the constraint condition learning device 1 suitably acquires data necessary for learning of the constraint conditions and executes learning of the constraint conditions by constructing a virtual robot system by simulation.

Second Modification

The constraint condition learning device 1 may formulate the operation plan of the robot 5 by any other method instead of formulating the operation plan of the robot 5 based on the temporal logic.

For example, the application information 41 includes design information such as a flowchart for designing a control input or subtask sequence corresponding to a task in advance, and the constraint condition learning device 1 may generate the control input or the subtask sequence by referring to the design information. For example, JP2017-39170A discloses a specific example of executing a task based on a pre-designed task sequence.

Second Example Embodiment

Figure 11:
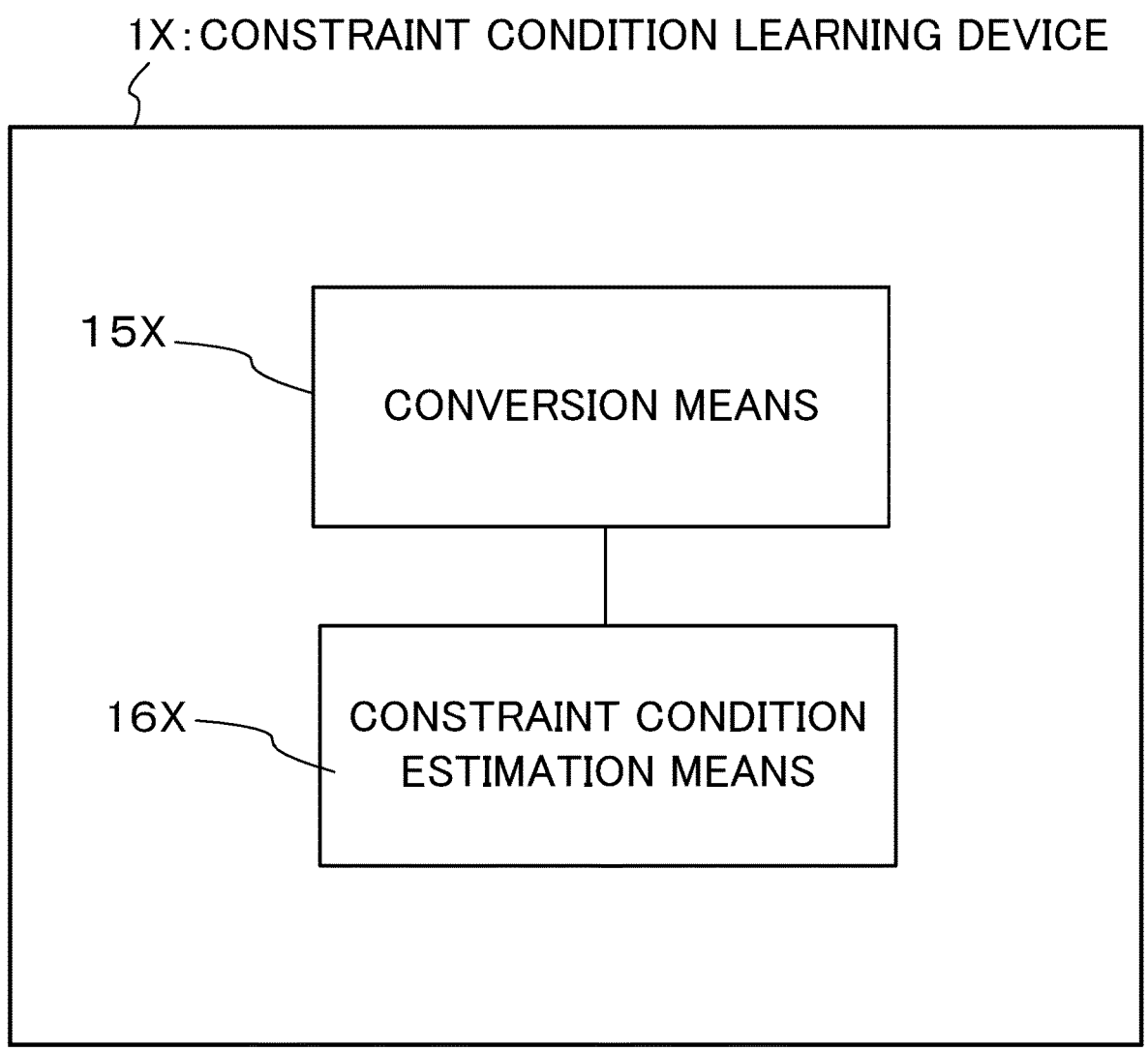
FIG. 11 It shows a schematic configuration diagram of a constraint condition learning device in the second example embodiment.

FIG. 11 shows a schematic configuration diagram of a constraint condition learning device 1X according to a second example embodiment. The constraint condition learning device 1X mainly includes a conversion means 15X and a constraint condition estimation means 16X. The constraint condition learning device 1X may be configured by a plurality of devices. Examples of the constraint condition learning device 1X include the constraint condition learning device 1 in the first example embodiment.

The conversion means 15X is configured to convert first time series data regarding a state and an input of a robot system during an execution period of a task executed by the robot system into second time series data represented by propositions. Here, the robot system may be a system realized by an actual machine, or may be a system virtually constructed by simulation in a computer. Examples of the conversion means 15X include the conversion unit 15 in the first example embodiment.

The constraint condition estimation means 16X is configured to estimate a constraint condition on the task as a logical formula, based on the second time series data and the information regarding whether or not the task succeeded. Examples of the second time series data include propositional time series data in the first example embodiment. Examples of the constraint condition estimation means 16X include the constraint condition estimation unit 16 in the first example embodiment.

Figure 12:
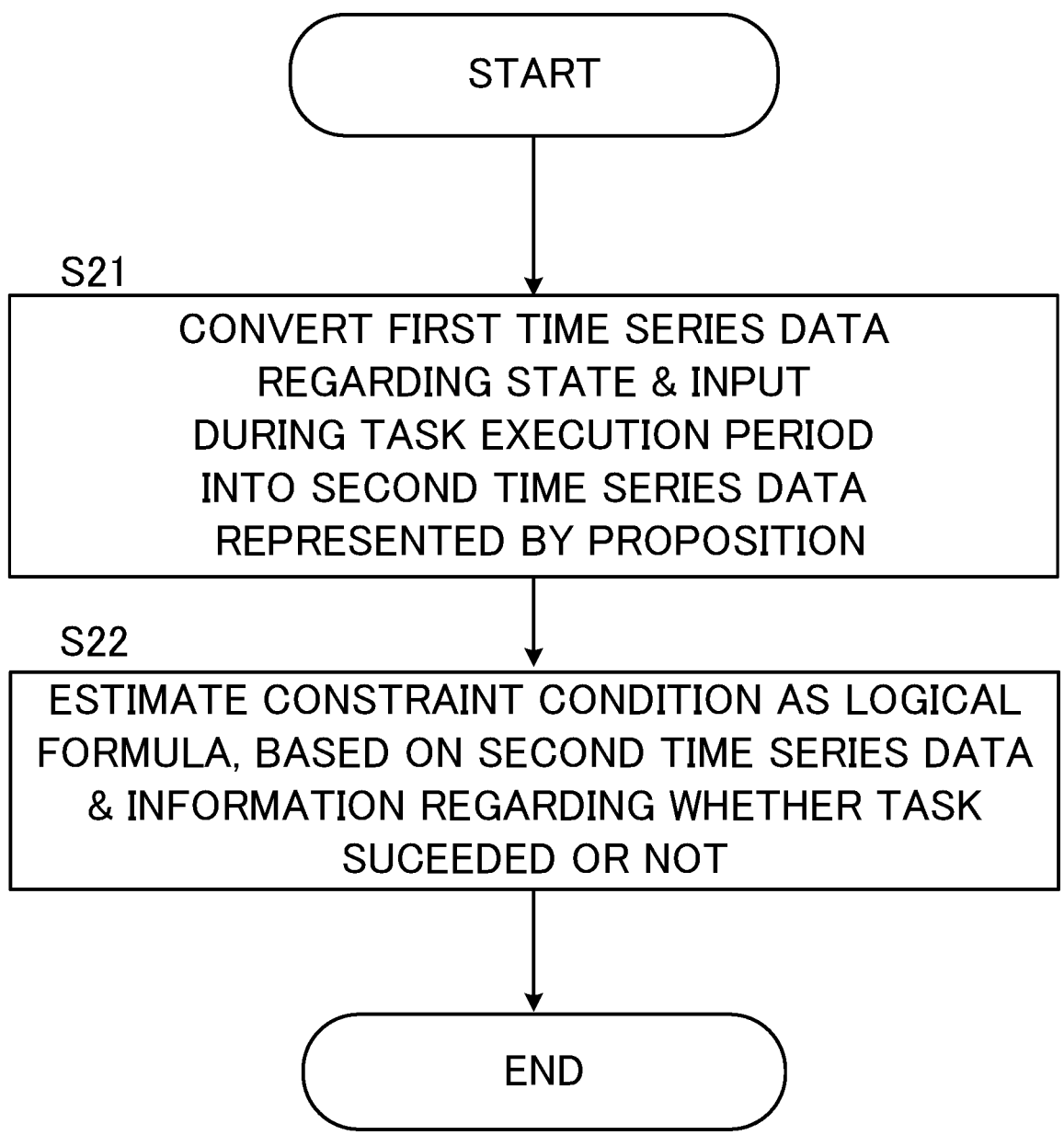
FIG. 12 It is an example of a flowchart that the constraint condition learning device executes in the second example embodiment.

FIG. 12 is an exemplary flowchart that is executed by the constraint condition learning device 1X in the second example embodiment. First, the conversion means 15X converts first time series data regarding a state and an input of a robot system during an execution period of a task executed by the robot system into second time series data represented by propositions (step S21). The constraint condition estimation means 16X is configured to estimate a constraint condition on the task as a logical formula, based on the second time series data and the information regarding whether or not the task succeeded (step S22).

According to the second example embodiment, the constraint condition learning device 1X can suitably learn a constraint condition required to succeed a task.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above (including modifications, the same shall apply hereinafter) can be described as, but not limited to, the following Supplementary Notes.

[Supplementary Note 1]

A constraint condition learning device comprising:
  a conversion means configured to convert
    first time series data regarding a state and an input of a robot system during an execution period of a task executed by the robot system
    into second time series data represented by propositions; and
  a constraint condition estimation means configured to estimate a constraint condition on the task as a logical formula, based on the second time series data and the information regarding whether or not the task succeeded.

[Supplementary Note 2]

The constraint condition learning device according to Supplementary Note 1, further comprising
  a task success determination means configured to determine whether or not the task succeeded, based on the first time series data or the second time series data.

[Supplementary Note 3]

The constraint condition learning device according to Supplementary Note 1 or 2, further comprising
  a learning constraint condition setting means configured to set, based on the logical formula, a learning constraint condition that is a constraint condition to be applied when the robot system subsequently executes the task.

[Supplementary Note 4]
The constraint condition learning device according to Supplementary Note 3,
wherein the learning constraint condition setting means is configured to set a logical formula that contradicts the logical formula as the learning constraint condition.

[Supplementary Note 5]
The constraint condition learning device according to Supplementary Note 3,
wherein the learning constraint condition setting means is configured to set the learning constraint condition, based on an evaluation index calculated using the second time series data.

[Supplementary Note 6]
The constraint condition learning device according to Supplementary Note 5,
wherein the learning constraint condition setting means is configured to set the learning constraint condition, based on the evaluation index obtained by integrating mean informational quantity regarding the second time series data with mean informational quantity regarding the constraint condition.

[Supplementary Note 7]
The constraint condition learning device according to any one of Supplementary Notes 1 to 6, further comprising
an updating means configured to update, based on a comparison result between the logical formula and existing constraint conditions that has already been fixed, the existing constraint conditions.

[Supplementary Note 8]
The constraint condition learning device according to Supplementary Note 7,
wherein the updating means is configured to:
hold the estimation result by the constraint condition estimation means including the logical formula as constraint condition candidate information representing a candidate for the constraint condition;
if the estimation result by the constraint condition estimation means is obtained, update the constraint condition candidate information based on the estimation result; and
if learning of the constraint condition is terminated, update the existing constraint conditions based on a comparison result between the constraint condition candidate information and the existing constraint conditions.

[Supplementary Note 9]
The constraint condition learning device according to Supplementary Note 7 or 8,
wherein the updating means is configured to display the comparison result on a display device and updates the existing constraint conditions based on external input by receiving the external input relating to update of the existing constraint conditions.

[Supplementary Note 10]
The constraint condition learning device according to any one of Supplementary Notes 1 to 7, further comprising
a first time series data acquisition means configured to
acquire the first time series data, based on a measurement result of a workspace for the task during the execution period, or
acquire the first time series data, based on a simulation result of execution of the task in the robot system which is virtually constructed by simulation.

[Supplementary Note 11]
A control method executed by a computer, the control method comprising:
converting
first time series data regarding a state and an input of a robot system during an execution period of a task executed by the robot system
into second time series data represented by propositions; and
estimating a constraint condition on the task as a logical formula, based on the second time series data and the information regarding whether or not the task succeeded.

[Supplementary Note 12]
A storage medium storing a program executed by a computer, the program causing the computer to:
convert
first time series data regarding a state and an input of a robot system during an execution period of a task executed by the robot system
into second time series data represented by propositions; and
estimate a constraint condition on the task as a logical formula, based on the second time series data and the information regarding whether or not the task succeeded.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

INDUSTRIAL APPLICABILITY

It is suitably applied to integration business of robot systems, UGV (Unmanned Ground Vehicle), UAV (Unmanned Aerial Vehicle), UUV (Unmanned Underwater Vehicle), robots in satellites (space station), and autonomous robot solutions such as planetary probes.

DESCRIPTION OF REFERENCE NUMERALS

1, 1X Constraint condition learning device
2 Instruction device
4 Storage device
5 Robot
7 Measurement device
41 Application information
42 Learning related information
43 Propositional time series data
44 Constraint condition candidate information
100 Robot system

What is claimed is:
1. A constraint condition learning device comprising:
at least one memory configured to store instructions; and
at least one processor configured to execute the instructions to:
convert first time series data regarding a state and an input of a robot system during an execution period of a task executed by the robot system into second time series data represented by propositions;

estimate a constraint condition on the task as a first logical formula, based on the second time series data and information regarding whether or not the task succeeded;

generate an operation sequence of the robot system based on the first logical formula;

control the robot system in accordance with the operation sequence; and set, based on the first logical formula, a second logical formula which contradicts the first logical formula as a learning constraint condition that is a constraint condition to be applied when the robot system subsequently executes the task.

2. The constraint condition learning device according to claim 1, wherein the at least one processor is further configured to execute the instructions to determine whether or not the task succeeded, based on the first time series data or the second time series data.

3. The constraint condition learning device according to claim 1, wherein the at least one processor is further configured to further execute the instructions to acquire the first time series data, based on a measurement result of a workspace for the task during the execution period, or acquire the first time series data, based on a simulation result of execution of the task in the robot system which is virtually constructed by simulation.

4. A constraint condition learning device comprising:

at least one memory configured to store instructions; and at least one processor configured to execute the instructions to:

convert first time series data regarding a state and an input of a robot system during an execution period of a task executed by the robot system into second time series data represented by propositions;

estimate a constraint condition on the task as a first logical formula, based on the second time series data and information regarding whether or not the task succeeded;

generate an operation sequence of the robot system based on the first logical formula;

control the robot system in accordance with the operation sequence; and set, based on the first logical formula, a second logical formula which contradicts the first logical formula as a learning constraint condition that is a constraint condition to be applied when the robot system subsequently executes the task, wherein the setting the learning constraint condition is based on an evaluation index calculated using the second time series data.

5. The constraint condition learning device according to claim 4, wherein the at least one processor is configured to execute the instructions to set the learning constraint condition, based on the evaluation index obtained by integrating a mean informational quantity regarding the second time series data with a mean informational quantity regarding the constraint condition.

6. A constraint condition learning device comprising:

at least one memory configured to store instructions; and at least one processor configured to execute the instructions to:

convert first time series data regarding a state and an input of a robot system during an execution period of a task executed by the robot system into second time series data represented by propositions;

estimate a constraint condition on the task as a first logical formula, based on the second time series data and information regarding whether or not the task succeeded;

generate an operation sequence of the robot system based on the first logical formula; and control the robot system in accordance with the operation sequence; and update, based on a comparison result between the first logical formula and existing constraint conditions that have already been fixed, the existing constraint conditions.

7. The constraint condition learning device according to claim 6, wherein the at least one processor is further configured to execute the instructions to:

hold the estimation result including the first logical formula as constraint condition candidate information representing a candidate for the constraint condition;

based on obtaining the estimation result, update the constraint condition candidate information based on the estimation result; and based on terminating learning of the constraint condition, update the existing constraint conditions based on a comparison result between the constraint condition candidate information and the existing constraint conditions.

8. The constraint condition learning device according to claim 6, wherein the at least one processor is further configured to execute the instructions to display the comparison result on a display device and update the existing constraint conditions based on external input by receiving the external input relating to update of the existing constraint conditions.

* * * * *